United States Patent [19]
Yang

[11] Patent Number: 6,161,581
[45] Date of Patent: Dec. 19, 2000

[54] VALVE DEVICE FOR WATER DISTRIBUTION PURPOSES

[76] Inventor: Tsai Chen Yang, P.O. Box 63-99, Taichung, Taiwan, 406

[21] Appl. No.: 09/473,267

[22] Filed: Dec. 24, 1999

[51] Int. Cl.[7] .................................................... F16K 11/06
[52] U.S. Cl. ........................................................ 137/625.19
[58] Field of Search ...................... 137/625.18, 625.19, 137/599.14

[56] References Cited

U.S. PATENT DOCUMENTS 3,865,139  2/1975  Tolnai ................................. 137/625.19
4,986,307  1/1991  Hardee ................................ 137/625.19

Primary Examiner—John Fox

[57] ABSTRACT

A valve device includes a housing having two inlets and two outlets. A valve stem is rotatably received in the housing and includes an annular swelling formed between two peripheral chambers which are communicated with the outlets of the housing. The valve stem has an aperture and a passage communicating the inlets with the peripheral chambers respectively for allowing the water from the different inlets to flow out through the respective outlets directly without being mixed within the housing and the valve stem.

12 Claims, 4 Drawing Sheets

VALVE DEVICE FOR WATER DISTRIBUTION PURPOSES

BACKGROUND OF THE INVENTION

1. Field of the Invention

The present invention relates to a valve, and more particularly to a valve device for water distribution purposes.

2. Description of the Prior Art

Typical valves may be disposed in a faucet for distributing the water, particularly the cold water and the hot water. The hot water and the cold water may be received and mixed within a chamber of the faucet before flowing out of the faucet. Some faucets may provide one outlet opening for discharging the raw water, and the other outlet opening for discharging a purified or filtered water. This kind of valve may not be used for distributing the water, because the raw water and the filtered water may be mixed within the faucet before discharging from the faucet.

The present invention has arisen to mitigate and/or obviate the afore-described disadvantages of the conventional valves.

SUMMARY OF THE INVENTION

The primary objective of the present invention is to provide a valve device for separately discharging the water or liquid from different sources.

In accordance with one aspect of the invention, there is provided a valve device comprising a housing including a bore formed therein, and including a first inlet and a second inlet formed therein for receiving water into the housing and communicating with the bore of the housing, and including a first outlet and a second outlet formed therein and communicating with the bore of the housing, and a valve stem rotatably received in the bore of the housing, the valve stem including a first peripheral chamber and a second peripheral chamber formed therein and including an annular swelling formed thereon and form between the first peripheral chamber and the second peripheral chamber, the first peripheral chamber being communicating with the first outlet of the housing and the second peripheral chamber being communicating with the second outlet of the housing, the valve stem including an aperture formed therein and communicating the first inlet with the first peripheral chamber of the valve stem for allowing the water from the first inlet to flow into the first peripheral chamber of the valve stem and to flow out through the first outlet of the housing, and the valve stem including a passage formed therein and communicating the second inlet with the second peripheral chamber of the valve stem for allowing the water from the second inlet to flow into the second peripheral chamber of the valve stem and to flow out through the second outlet of the housing.

Two sealing members are further engaged between the housing and the valve stem and selectively aligning with the aperture and the passage of the valve stem respectively. The housing includes two orifices formed therein and communicating with the first inlet and the second inlet respectively for slidably receiving the valve members respectively. A spring biasing device may further be provided for biasing the valve members to engage with the valve stem.

The housing includes a pair of annular recesses formed therein and communicating with the first peripheral chamber and the second peripheral chamber respectively. The valve stem includes at least one fin formed thereon and connected to the annular swelling for reinforcing purposes. The valve stem includes a block formed therein for defining the passage of the valve stem.

A limiting device is further provided for limiting a relative rotational movement between the valve stem and the housing, and includes a gasket disposed in the housing and having a stop extended therefrom, and includes a rib formed in the valve stem and engaged with the stop for limiting the relative rotational movement between the valve stem and the housing when the valve stem is rotated relative to the housing. The valve stem includes a curved notch formed therein for defining the rib. The valve stem includes an extension extended therefrom and having the curved notch formed in the extension. A knob is further secured to the valve stem for rotating the valve stem relative to the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
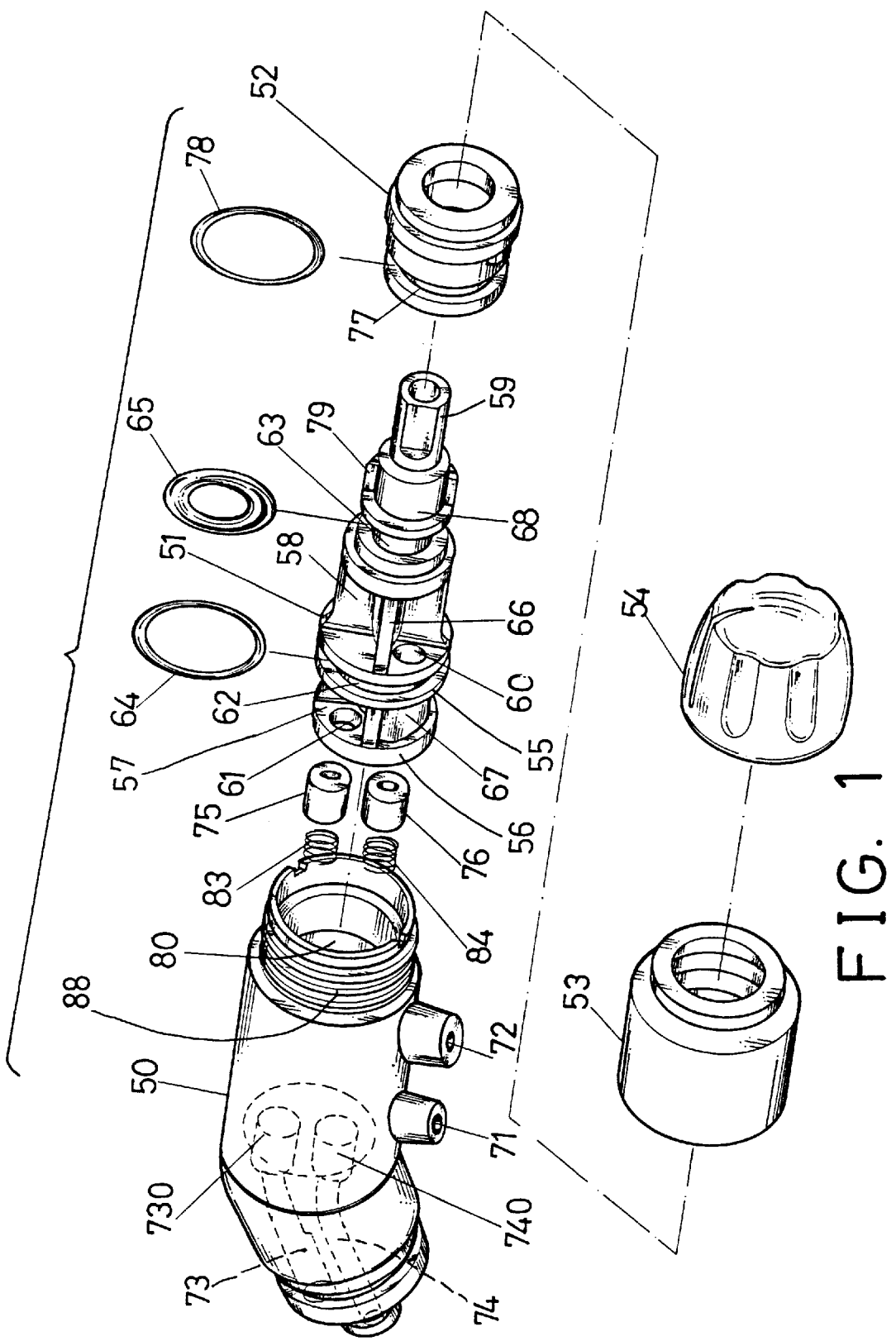
FIG. 1 is an exploded view of a valve device in accordance with the present invention.
Figure 3:
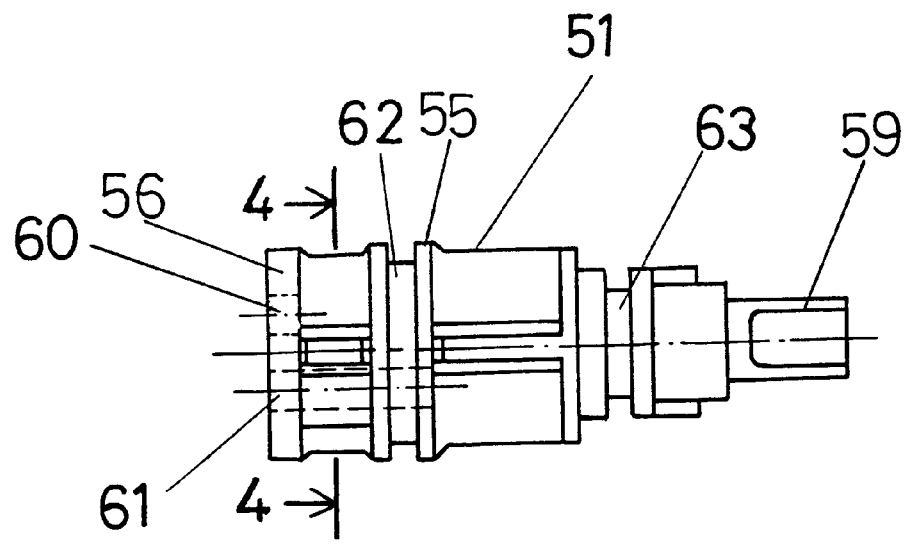
FIG. 3 is a plane view of a valve stem.
Figure 2:
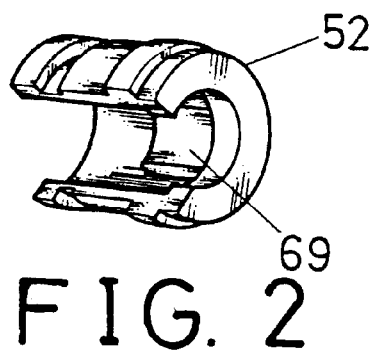
FIG. 2 is a perspective view of a gasket, in which a quarter of the gasket is cut off for showing the inner structure of the gasket.
Figure 4:
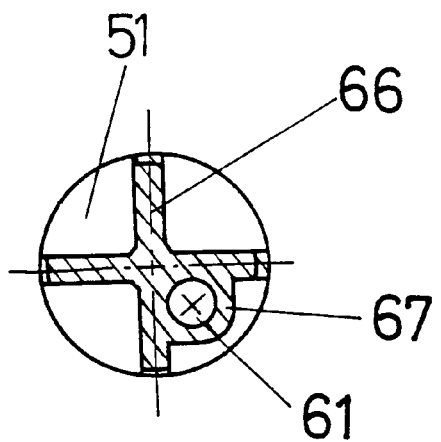
FIG. 4 is a partial cross sectional view taken along lines 4—4 of FIG. 3.

Referring to the drawings, and initially to FIGS. 1–5, a valve device in accordance with the present invention comprises a housing 50 including a bore 80 formed therein, and including two outlets 71, 72 communicating with the bore 80 thereof, and including two inlets 73, 74 formed in one end thereof and communicating with the bore 80 of the housing 50 and coupled to two different water or liquid sources for receiving the water or the liquid from the water or liquid sources. For example, the inlet 73 is coupled to a raw water source, and the inlet 74 is coupled to a filtered water source, and vice versa. The housing 50 includes an enlarged orifice 730, 740 formed in the inner end of the respective inlets 73, 74 and closer to the bore 80 of the housing 50 for slidably receiving a cylindrical sealing member 75, 76 respectively. The housing 50 includes an outer thread 88 formed in the other end thereof. A cover 53 includes an inner thread formed therein for threading with the outer thread 88 of the housing 50 and for securing the cover 53 to the housing 50. The housing 50 includes two annular recesses 81, 82 (FIGS. 5, 6) formed therein and defined by one or more peripheral bulges 86, 87, and communicating with the outlets 71, 72 respectively.

A valve stem 51 is slidably received in the bore 80 of the housing 50 and includes an annular swelling 55 formed in the middle portion thereof and formed between two peripheral chambers 57, 58 or for defining the peripheral chambers 57, 58 which are communicated with the annular recesses 81, 82 of the housing 50 respectively. The valve stem 51 preferably includes a disc 56 formed in one end thereof for defining the peripheral chamber 57 of the valve stem 51 together with the annular swelling 55. The valve stem 51 includes one or more fins 66 formed therein or coupled between the annular swelling 55 and/or the disc 56 for reinforcing purposes. The fins 66 include a size smaller than the size of the disc 56 which has a size no greater than the size of the bore 80 of the housing 50. The annular swelling 55 includes an annular groove 62 formed therein for receiving a sealing ring 64 which is slidably engaged with the peripheral bulge 86 of the housing 50 for making a water tight seal between the annular swelling 55 of the valve stem 51 and the housing 50 and for preventing water from flowing between the peripheral chambers 57, 58 and the annular recesses 81, 82.

The disc 56 includes an aperture 61 formed in the disc 56 for communicating the inlet 74 of the housing 50 with the peripheral chamber 57 of the valve stem 51 and the annular recess 81 and the outlet 71 of the housing 50 (FIGS. 6, 8), and for allowing the water from the inlet 74 to flow into the peripheral chamber 57 and to flow out through the outlet 71 only. The valve stem 51 includes a passage 60 formed therein for communicating the other inlet 73 of the housing 50 with the peripheral chamber 58 of the valve stem 51 and the annular recess 82 and the outlet 72 of the housing 50 (FIGS. 5, 7), and for allowing the water from the inlet 73 to flow into the peripheral chamber 58 and to flow out through the outlet 72 only. The valve stem 51 includes a block 67 (FIG. 4) formed therein for defining the passage 60 therein and for preventing the passage 60 from communicating with the peripheral chamber 57 of the valve stem 51. The sealing members 75, 76 each includes a spring 83, 84 engaged therein for biasing the sealing members 75, 76 to engage with the disc 56 of the valve stem 51 and to make a water tight seal with the valve stem 51, and for allowing the water from the inlets 73, 74 to flow only into the passage 60 and the aperture 61 of the valve stem 51 respectively when the passage 60 and the aperture 61 of the valve stem 51 are selectively connected to the inlets 73, 74 respectively by rotating the valve stem 51.

The valve stem 51 includes an extension 59 extended therefrom and extended outward through the cover 53. The extension 59 includes an annular recess 63 formed therein for receiving a sealing ring 65 therein, and includes a curved notch 68 formed therein and defined by a curved rib 79. A cylindrical gasket 52 is received in the cover 53 and secured to the housing 50 by the cover 53 and includes an annular groove 77 formed in the outer peripheral portion thereof for receiving a sealing ring 78 which makes a water tight seal between the valve stem 51 and the housing 50 together with the gasket 52. The gasket 52 includes a projection stop 69 extended radially inward therefrom and slidably received in the curved notch 68 of the valve stem 51 relatively for limiting the relative rotational movement of the valve stem 51 relative to the housing 50 and the cover 53. A control ferrule or a knob 54 is secured to the extension 59 of the valve stem 51 for rotating the valve stem 51 relative to the housing 50. The stop 69 may be slided between the ends of the curved notch 68 of the valve stem 51 and may be engaged with the curved rib 79 for limiting the relative rotational movement of the valve stem 51 relative to the housing 50 and the cover 53 and for guiding and aligning the passage 60 with the inlet 73 (FIG. 7) and for guiding and aligning the aperture 61 with the inlet 74 (FIG. 8).

Figure 5:
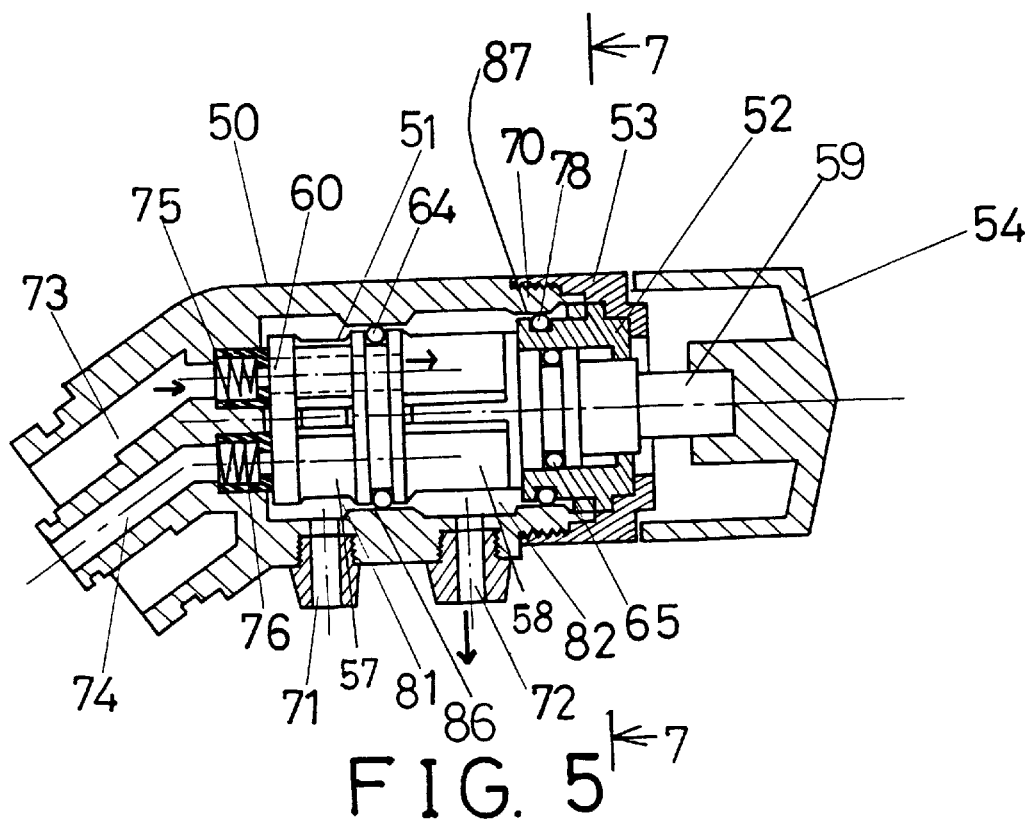
FIG. 5 is a cross sectional view taken along lines 5—5 of FIG. 7.
Figure 6:
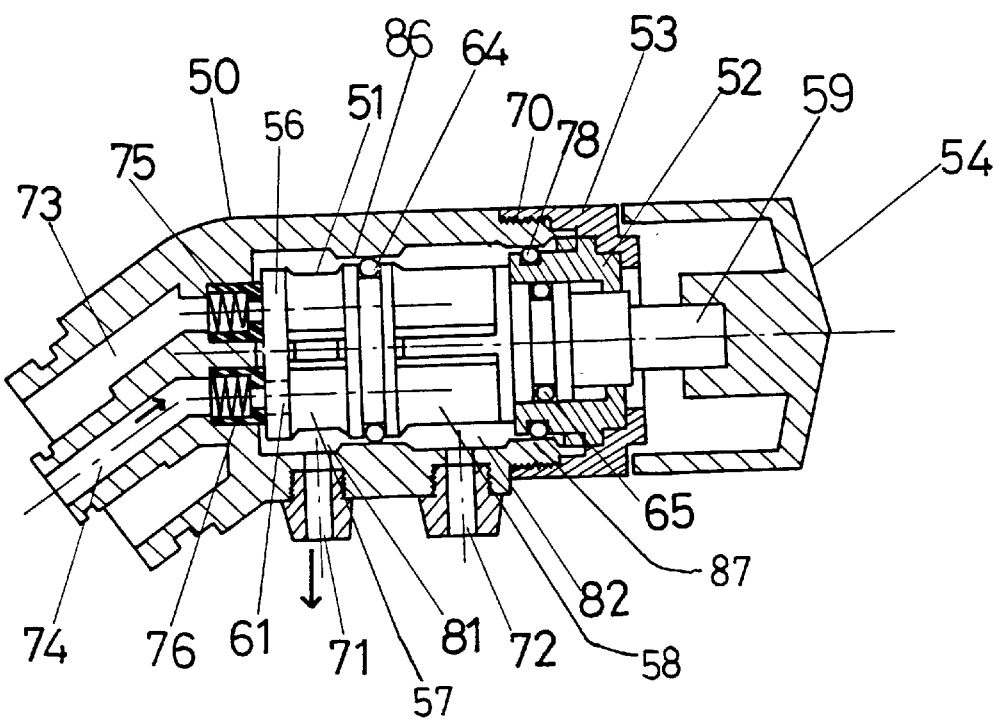
FIG. 6 is a cross sectional view similar to FIG. 5, illustrating the operation of the valve device.
Figure 7:
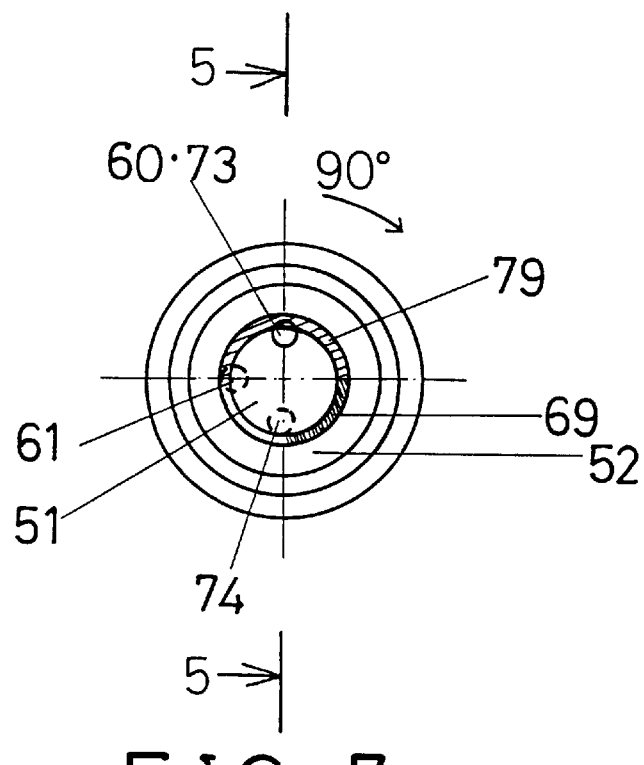
FIG. 7 is a cross sectional view taken along lines 7—7 of FIG. 5.
Figure 8:
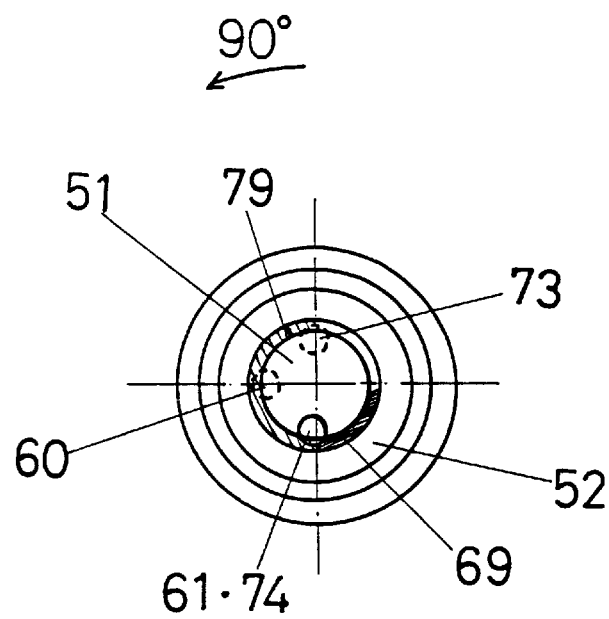
FIG. 8 is a cross sectional view similar to FIG. 7, illustrating the operation of the valve device.

In operation, as shown in FIGS. 5, 7, when the passage 60 of the valve stem 51 is aligned with the inlet 73 by rotating the valve stem 51 with the knob 54, the water from the inlet 73 may flow into the peripheral chamber 58 and the annular recess 82 and may then flow out through the outlet 72. As shown in FIGS. 6 and 8, when the aperture 61 of the valve stem 51 is aligned with the inlet 74, the water from the inlet 74 may flow into the peripheral chamber 57 and the annular recess 81 and may then flow out through the outlet 71. The water from the inlets 73, 74 and from different sources may thus directly flow out through the respective outlet 71, 72 without being mixed within the valve device.

Accordingly, the valve device in accordance with the present invention may be used for separately discharging the water or liquid from different sources.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve device comprising:

a housing including a bore formed therein, and including a first inlet and a second inlet formed therein for receiving water into said housing and communicating with the bore of the housing, and including a first outlet and a second outlet formed therein and communicating with the bore of the housing, and a valve stem rotatably received in said bore of said housing, said valve stem including a first peripheral chamber and a second peripheral chamber formed therein and including an annular swelling formed thereon and form between said first peripheral chamber and said second peripheral chamber, said first peripheral chamber being communicating with said first outlet of said housing and said second peripheral chamber being communicating with said second outlet of said housing, said valve stem including an aperture formed therein and communicating said first inlet with said first peripheral chamber of said valve stem for allowing the water from said first inlet to flow into said first peripheral chamber of said valve stem and to flow out through said first outlet of said housing, and said valve stem including a passage formed therein and communicating said second inlet with said second peripheral chamber of said valve stem for allowing the water from said second inlet to flow into said second peripheral chamber of said valve stem and to flow out through said second outlet of said housing.

2. The valve device according to claim 1 further comprising two sealing members engaged between said housing and said valve stem and selectively aligning with said aperture and said passage of said valve stem respectively.

3. The valve device according to claim 2, wherein said housing includes two orifices formed therein and communicating with said first inlet and said second inlet respectively for slidably receiving said valve members respectively.

4. The valve device according to claim 2 further comprising means for biasing said valve members to engage with said valve stem.

5. The valve device according to claim 1, wherein said housing includes a pair of annular recesses formed therein and communicating with said first peripheral chamber and said second peripheral chamber respectively.

6. The valve device according to claim 1, wherein said valve stem includes at least one fin formed thereon and connected to said annular swelling for reinforcing purposes.

7. The valve device according to claim 1, wherein said valve stem includes a block formed therein for defining said passage of said valve stem.

8. The valve device according to claim 1 further comprising means for limiting a relative rotational movement between said valve stem and said housing.

9. The valve device according to claim 8, wherein said limiting means includes a gasket disposed in said housing and having a stop extended therefrom, and includes a rib formed in said valve stem and engaged with said stop for limiting the relative rotational movement between said valve stem and said housing when the valve stem is rotated relative to the housing.

10. The valve device according to claim 9, wherein said valve stem includes a curved notch formed therein for defining said rib.

11. The valve device according to claim 10, wherein said valve stem includes an extension extended therefrom and having said curved notch formed in said extension.

12. The valve device according to claim 1 further comprising a knob secured to said valve stem for rotating said valve stem relative to said housing.

* * * * *